United States Patent

Sperlich et al.

[11] Patent Number: 6,080,232
[45] Date of Patent: Jun. 27, 2000

[54] SPHERICAL COLOR PIGMENTS, PROCESS FOR THEIR PRODUCTION AND USE THEREOF

[75] Inventors: Jörg Sperlich, Offenbach; Ralph Brandes, Pohlheim; Hauke Jacobsen, Rheinfelden; Stipan Katusic, Kelkheim; Andreas Schulz, Neu-Isenburg, all of Germany

[73] Assignee: Degussa Aktiengesellschaft, Frankfurt, Germany

[21] Appl. No.: 08/970,759

[22] Filed: Nov. 14, 1997

[30] Foreign Application Priority Data

Nov. 14, 1996 [DE] Germany ............................ 196 47 037

[51] Int. Cl.⁷ ............................ C01B 13/14; C01B 13/18; C01B 13/34; C01B 1/00
[52] U.S. Cl. .......................... 106/436; 106/401; 106/419; 106/430; 106/431; 106/436; 106/439; 106/440; 106/449; 106/451; 106/459; 106/461; 106/480; 106/479; 106/453; 106/456
[58] Field of Search ..................... 106/401, 436, 106/439, 440, 451, 461, 479, 453, 456, 459, 480, 419, 430, 431, 449; 423/592, 593, 594, 598, 600, 604, 605, 607, 608, 610, 622, 625, 632, 635

[56] References Cited

U.S. PATENT DOCUMENTS

| | | | |
|---|---|---|---|
| 4,075,029 | 2/1978 | Nuss ........................................ | 106/480 |
| 4,420,340 | 12/1983 | Mohr et al. ............................. | 106/288 |
| 5,194,089 | 3/1993 | Speer et al. ............................ | 106/426 |
| 5,348,914 | 9/1994 | Thometzek et al. ................... | 106/480 |
| 5,358,695 | 10/1994 | Helble et al. .......................... | 501/94 |
| 5,449,565 | 9/1995 | Aoki et al. ............................. | 106/456 |
| 5,753,026 | 5/1998 | Kuntz et al. ........................... | 106/450 |

FOREIGN PATENT DOCUMENTS

| | | |
|---|---|---|
| 0 371 211 | 6/1990 | European Pat. Off. . |
| 0 681 989 | 11/1995 | European Pat. Off. . |
| 4 307 333 | 9/1994 | Germany . |
| 57-067669 | 4/1982 | Japan . |
| 60-081012 | 5/1985 | Japan . |
| 2 074 399 | 9/1995 | Spain . |

OTHER PUBLICATIONS

Database WPI, Week 8711, Derwent Publications Ltd., London, GB; AN 87–075367, XP002115424 & JP 62 027310 A (Tokuyama Soda), Feb. 5, 1987.
Patent Abstracts Of Japan, vol. 12, No. 11 (C–468), Jan. 13, 1988 & JP 62 167206 A (Mitsubishi Chem. Ind.), Jul. 23, 1987.
Database WPI, Week 8722, Derwent Publications Ltd., London, GB; AN 87–154034, XP002115425 & JP 62 091422 A (Sumitomo Metal Mining et al.), Apr. 25, 1987.
Suyama et al., *Ceramics International*, vol 8, No. 1 (1982) pp. 17–21 characterization & sintering of Mg–Al spinel prepared by spray pyrolysis technique (no month).

*Primary Examiner*—Michael Marcheschi
*Attorney, Agent, or Firm*—Wenderoth, Lind & Ponack L.L.P.

[57] ABSTRACT

The invention relates to spherical colored pigments having an average particle diameter of less than 10 $\mu$m on the basis of an oxide, a mixed oxide or a silicate. The pigments are obtainable by means of spray-pyrolysis technology: a solution containing oxide-forming or silicate-forming metal compounds is converted into an aerosol and the latter is fed, preferably after predrying, to a pyrolysis reactor; the pigment is separated from the pyrolysis gas. The colored pigments according to the invention are suitable for the production of ceramic decorations and for the coloring of plastics, synthetic foils, fibers and also lacquers. By reason of the spherical shape, unusual technical application properties are achieved.

13 Claims, 2 Drawing Sheets

SPHERICAL COLOR PIGMENTS, PROCESS FOR THEIR PRODUCTION AND USE THEREOF

The invention is directed towards colored pigments consisting of substantially spherical pigment particles having an average particle diameter of less than 10 μm on the basis of oxides, mixed oxides or silicates. In particular it is directed to colored pigments based on spinel. A further subject is directed towards a process for the production of colored pigments according to the invention as well as the use thereof.

BACKGROUND OF THE INVENTION

The classical production of inorganic pigments comprises, in general, the steps of homogenizing suitable raw materials, transferring the mixture into chamotte crucibles, annealing the raw-material mixture, breaking the incandescent material, single-stage or multi-stage wet grinding to coloring-matter fineness and drying. With a view to producing the raw materials, additional steps may be necessary, for example a precipitating process. The production consequently requires a high degree of technical effort which increases considerably with diminishing grain diameter. Pigments having a grain diameter in the range from a few microns down to submicron size are no longer obtainable in practice by means of the conventional comminution techniques. In addition, the risk then exists of influencing the color of the pigments as a result of attrition of grinding aids and mills that are employed.

The production of ceramic decorative colors and enamels has hitherto necessitated a joint grinding, ordinarily wet grinding, of a colored pigment with a flux, a glass frit for example, in order to achieve the fineness that is required for the screen printing and to enable good development of color in the course of decoration firing. Accordingly an objective of the invention consists in making available colored pigments for ceramic applications in such a form and granulation that a simple dry mixing may take the place of a grinding process.

The pigments obtained by conventional processes exhibit an irregular shape having fractured edges. Pigments of this type cause problems, even if the average grain diameter is sufficiently small and the grain-size range is sufficiently narrow, in the course of the spinning of materials colored with them. For instance, in the course of melt spinning, corrosion phenomena occur on the spinnerets or other faults arise, for example as a result of blocking of the spinnerets. Hitherto such problems have limited the use of conventional pigments of non-spherical shape for the production of spin-dyed fibers.

Pigments that are as finely divided as possible, preferably those which are intended in addition to exhibit a very narrow grain-size range, are particularly significant in all fields where the pigmented materials find application in the form of very thin decorative coatings, foils or fibers. An interest also exists in substantially spherical pigments, in order to avoid application problems caused by the hitherto irregular shape of the pigment particles.

From ES Patent 2 074 399 a process is known for the production of spherical, finely divided pigments on the basis of zirconium silicate. In this process a mixture consisting of a zirconium alkoxide such as $Zr(O-n-C_3H_7)_4$ and a silicon alkoxide such as $Si(OC_2H_5)_4$ is prehydrolyzed by means of moist air. After addition of vanadyl chloride—molar ratio V/Zr 0.02 to 0.04—and conversion of the precondensed mixture thus obtained into an aerosol, condensation is completed by means of moist air. The amorphous powder is then calcined for 24 h at 1500° C. Disadvantages of this process are the long reaction-times for the prehydrolysis and calcination. In addition, as has been determined on the basis of the investigation of spinel pigments and $ZrO_2$ pigments, in the course of calcination the initially spherical particles become caked together, necessitating a subsequent grinding process and therefore impairing the spherical shape of the pigment particles.

Ceramic spherical particles in the range from a few microns down to submicron size are available by means of the so-called spray-pyrolysis technique. With this technique an aerosol consisting of a solution or suspension of substances from which the fine powder to be produced can be formed is introduced into a heatable reactor, whereby the solvent or suspending agent evaporates and solid residual particles are formed which can in turn be converted by a decomposition reaction or another chemical reaction into the desired product.

Using a solution containing Mg nitrate and Al nitrate, Mg—Al spinel can be produced (Ceramic International Vol. 8 (1982) 17–21) by spray-pyrolysis technology in the form of hollow spheres having a particle diameter of 1 to 10 μm. Through the use of a combustible gas for the purpose of atomizing the solution, it is possible to obtain $MgAl_2O_4$ and also other colorless oxide-ceramic powders on the basis of Mg, Y, Al and Zr having a particle size in the range from 0.1 to 3 μm (EP-B 0 371 211). The exclusive or concomitant use of metal compounds of color-imparting elements in connection with the spray-pyrolysis technique for the purpose of obtaining a colored oxide or mixed oxide and the use thereof as colored pigment is neither mentioned nor suggested in either of the two aforementioned documents.

According to EP-A 0 681 989, with a view to producing a multi-element metal oxide by way of precursor for high-temperature superconductivity ceramics by spray pyrolysis, the aerosol is introduced into an independently operated oxyhydrogen flame, whereby a lower flame temperature, namely 800 to 1100° C., is adjustable and hence the mixed oxides are obtainable not in the high-temperature modifications that are less suitable for the stated purpose but in other modifications. A further modification of the spray-pyrolysis process with a view to producing metal-oxide powders for heavy-duty ceramics is taught by DE-OS 43 07 333. According to this patent a micro-emulsion consisting of an organic phase and an aqueous solution dispersed therein of the metal compounds is fed in aerosol form to the pyrolysis reactor. Even though color-imparting elements such as V, Cr, Mn, Fe, Co, Ni and Cu are also named among the elements as sources for the metal-oxide powders, in this case it is a question, as the example of DE-OS 43 07 333 also shows, of elements that are contained in a small quantity in a matrix which in itself is colorless. Suggestions with regard to employing compounds of color-imparting elements on their own or in combination with other compounds in a solution to be fed in the form of an aerosol to the pyrolysis reactor in such a quantity as to result in powders of intense color and with regard to using the latter as a colored pigment cannot be inferred from the two last-named documents.

DESCRIPTION OF THE INVENTION

Accordingly an object of the present invention is the provision of pigments consisting of substantially spherical pigment particles, designated simply in the following as spherical pigments, on the basis of oxides, mixed oxides or silicates.

Substantially spherical colored pigments have been discovered having an average particle diameter of less than 10 $\mu$m on the basis of an oxide, a mixed oxide or a silicate.

The term "colored pigments" is to be understood to include brightly colored pigments and grey to black pigments but not white pigments. Pigments according to the invention may contain one or more metals, in particular two or three metals. The oxides, mixed oxides and silicates may be present in differing crystal structures. The crystal structures depend, on the one hand, on the metal atoms that are present, on the other hand on the reaction temperature and dwell-time of the particles in the flame of the pyrolysis reactor, and also on the manner of cooling the pigment particles.

The pigments contain at least one color-imparting metal, which preferably occupies regular positions of the crystal lattice, for example of a spinel lattice, in regular distribution. The color-imparting element may also occupy positions in a host lattice. Examples of these are vanadium-doped or praseodymium-doped pigments on the basis of $ZrO_2$, $ZrSiO_4$ and $SnO_2$, which are numbered amongst the host-lattice pigments.

Preferred pigments according to the invention are spinels of the general formula $AB_2O_4$, wherein the metal atoms A, which occupy the tetrahedron vacancies in the oxygen lattice, stand for one or more divalent elements selected from the group $Mg^{2+}$, $Ca^{2+}$, $Sr^{2+}$, $Ba^{2+}$, $Mn^{2+}$, $Fe^{2+}$, $Co^{2+}$, $Ni^{2+}$, $Cu^{2+}$ and $Zn^{2+}$ and the metal atoms B, which occupy the octahedron vacancies, stand for one or more trivalent elements selected from the group $Al^{3+}$, $Ga^{3+}$, $In^{3+}$, $Sc^{3+}$, $Ln^{3+}$, $Ti^{3+}$, $V^{3+}$, $Cr^{3+}$, $Fe^{3+}$, $Ni^{3+}$ and $Co^{3+}$ and at least one color-imparting metal is present in a quantity that is effective as a pigment. The term "quantity that is effective as a pigment" is to be understood to mean, in the case of spinels, at least 25 mol-%, relative to the metals present in the pigment. It may also be a question of inverse spinels of the general formula $B(AB)O_4$, in which one half of the metal atoms B occupy the tetrahedron vacancies and the octahedron vacancies are occupied by the A atoms and the other half of the B atoms. Finally, so-called 4,2-spinels, in which A stands for a tetravalent element, in particular $Ti^{4+}$ or $Zr^{4+}$ and B stands for a divalent element, in particular $Fe^{2+}$, $Co^{2+}$ or $Ni^{2+}$, are also possible. Preferred pigments having spinel structure contain one or more A elements selected from the group $Mg^{2+}$, $Fe^{2+}$, $Co^{2+}$, $Ni^{2+}$, $Cu^{2+}$ and one or more B elements selected from the group $Al^{3+}$, $Cr^{3+}$, $Fe^{3+}$, $Co3+$. Particularly preferred pigments from the group of the spinels are colored yellow, blue, green, brown and grey to deep black. Examples of these are blue to green pigments of the formula $Co(Al_{2-x}Cr_x)O_4$, black pigments of the formula $Cu(Cr_{2-x}Fe_x)O_4$ and green pigments of the formula $(Ni_{2-x}Co_x)TiO_4$, where x is a number between 0 and 2.

An example of a simple metal oxide according to the invention is $Cr_2O_3$. Also obtainable by means of the process according to the invention are spherical vanadium-doped and praseodymium-doped metal oxides and silicates, selected for example from the group $SnO_2$, $SiO_2$, $ZrO_2$, $ZrSiO_4$, having a $D_{50}$ value of less than 10 $\mu$m. In the process according to ES Patent 2 074 399, on the other hand, during calcination of a spherical initial product for vanadium-doped zirconium silicate that is obtained to begin with, the particles become caked together and hence a drastic growth in the particle size occurs, so that the original spherical shape is lost and in certain circumstances the sintered material has to be ground.

Figure 1:
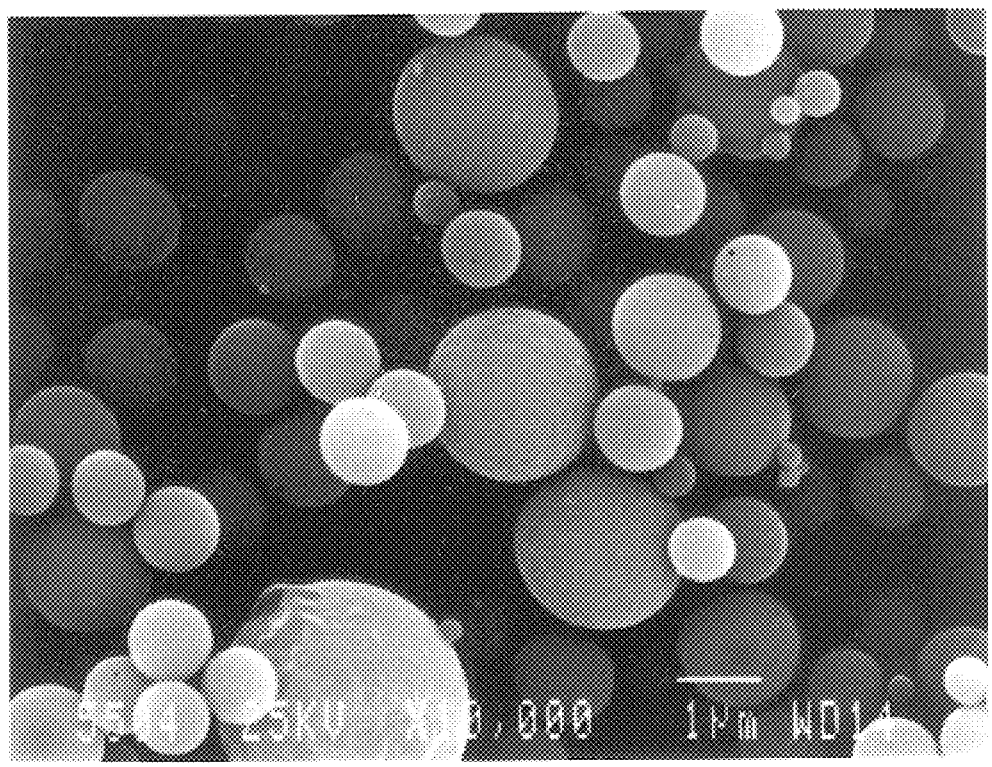
FIG. 1 is an SEM photograph of the pigment according to Example 3.

The spherical shape of colored pigments according to the invention is evident from FIG. 1, which shows an SEM photograph of the black spinel pigment corresponding to the formula $Cu(CrFe)O_4$ according to Example 3.

However, the term "substantially spherical" also includes particles having a spherical shape that is somewhat deformed, for example as a result of formation of individual crystal faces on the particle while largely retaining a spherical habit and also fragments of spheres.

The average particle diameter ($D_{50}$) of pigments according to the invention is smaller than 10 $\mu$m. It preferably lies in the range between 0.5 and 5 $\mu$m and in particular between 1 and 3 $\mu$m. The particle-size range of the pigment is expediently very narrow. Preferably substantially 100% of the pigment particles are smaller than 10 $\mu$m. In particularly preferred manner at least 80% of the particles exhibit a particle diameter in the range from 0.5 to 5 $\mu$m.

The colored pigments according to the invention are distinguished by their homogeneity, their spherical shape or a shape approximating to spherical, and also their fineness and the narrow grain-size range of the particles. This results in surprising advantages when they are employed for the coloring of plastics such as, in particular, fibers and foils and lacquers, and also in connection with the production of decorative colors and enamels and the application thereof by means of screen printing. Also available for the stated use are, in addition to the colored pigments according to the invention, substantially spherical white pigments which are obtainable by a process pertaining to spray-pyrolysis technology.

In the course of the melt spinning of thermoplastic polymers that are capable of being spun and that are colored with colored pigments according to the invention, such as polyolefins, polyamides and polyesters, the operational disorders that occur with non-spherical pigments no longer arise. Colored pigments according to the invention are also obtainable in deep-black color. Pigments of this type display a better fastness to light than organic black colors. Hence, light-resistant black fibers are able to be produced.

In the course of the production of decorative colors, enamels and glass colors the hitherto conventional grinding step is superfluous, since the colored pigments according to the invention can be admixed in dry form with the other components of the colors that are of application-specific composition. Another advantage is the improved capacity for screen printing of color pastes containing colored pigments according to the invention, inasmuch as by virtue of the spherical shape of the pigment in conjunction with the narrow grain-size range and the extensive absence of oversize material having a diameter of more than 10 $\mu$m, or even of more than 5 $\mu$m, an improved screen product is achieved.

The spherical pigments according to the invention can be obtained by means of a produces comprising the following steps:

(i) preparation of a solution, suspension or emulsion containing one or more oxide-forming or silicate-forming metal compounds, including at least one color-imparting metal compound in a quantity that is effective as a pigment, (ii) conversion of the solution, suspension or emulsion into an aerosol, (iii) introduction of the aerosol into a pyrolysis reactor that is heated directly or indirectly, (iv) implementation of pyrolysis at a temperature above the decomposition-temperature of the metal compounds, and (v) elimination of the pigment from the pyrolysis gas.

The pyrolysis reaction underlying the process according to the invention, designated in the literature as spray, flame or aerosol pyrolysis, is known per se, as is evident from the state of the art which has been discussed above. Surprisingly, however, it has never before been utilized for the production of spherical pigments according to the invention which contain at least one color-imparting metal atom in a quantity that is effective as a pigment. In the case of host-lattice pigments a quantity of, in general, approximately 1 to 5 mol-%, relative to the metals of the host lattice, is effective as a pigment. In the case of other colored pigments the quantity of coloring metal amounts in general to at least 25 mol-%, mostly approximately 30 to 50 mol-%, relative to metals in the pigment. If the initial oxide-forming and silicate-forming products employed in the process contain no color-imparting metal atom, colorless to white products are obtained which can optionally be used as white pigment in the same manner as the colored pigments according to the invention.

In the pyrolysis reactor the steps of decomposition of the precursors that form oxide and silicate, oxidation of optionally present organic constituents, formation of oxide or silicate and sintering proceed simultaneously or in succession within each individual particle. As a result, spherical particles having a low specific surface are obtained. The size distribution of the pigment particles that are obtained arises substantially directly from the droplet-size range of the aerosol that is fed to the reactor and from the concentration of the solution employed or, in case a suspension, is fed to the reactor, and also from the degree of dispersion.

The heating of the reactor may be effected directly, that is to say by means of a flame, or also indirectly from outside, for example by means of an electric furnace. On account of the temperature gradient from outside to inside that is required in the case of indirect heating, the furnace has to be at a substantially higher temperature than that which is required for the pyrolysis. An indirect heating requires a temperature-stable furnace material and an elaborate reactor design, on the other hand the overall quantity of gas is lower than in the case of a flame reactor. Use may be made of conventional combustible gases for the purpose of direct heating, but use is preferably made of hydrogen (a hydrogen/air flame reaches a maximum temperature of 2045° C.). The temperature in the reactor can be controlled by means of the ratio of the quantity of combustible gas to the overall quantity of gas. In order to keep the overall quantity of gas low and hence achieve a temperature that is as high as possible, instead of air by way of $O_2$ source for combustion of the combustible gas, oxygen may also be fed to the reactor. The overall quantity of gas also includes the carrier gas for the aerosol as well as the gas arising from evaporation of the solvent of the aerosol, for example $H_2O$. With a view to simpler design of a furnace with direct heating, this embodiment is preferred. The aerosol to be fed to the reactor is expediently passed directly into the flame. Whereas air is mostly preferred by way of carrier gas for the aerosol, it is also possible to use nitrogen, $CO_2$, $O_2$ or a combustible gas, for instance hydrogen, methane, propane or butane.

The temperature in the reactor lies above the decomposition temperature of the metal compounds, to be specific at a temperature that is sufficient for the formation of oxide or silicate, ordinarily in the range between 500 and 2000° C., preferably between 800 and 1300° C. A temperature gradient develops within the reactor, which is ordinarily of tubular design. Depending on the temperature of the flame, pigments having different modifications and hence different colors can be obtained with the same aerosol composition. From an aerosol containing divalent Co ions and trivalent ions selected from the group Al and/or Cr in an atomic ratio of 1 to 2, at low flame temperature turquoise-blue pigments are obtainable, and at higher flame temperature turquoise-green pigments. The pyrolysis gas is generally partially cooled prior to separation of the pigment particles contained therein. The temperature profile in the actual reactor as well as the manner of cooling of the pyrolysis gas may influence the modification of the pigment particles formed. As a result of rapid cooling it is possible to freeze a high-temperature modification that has been formed initially. Expediently the pyrolysis gas is cooled prior to separation of the particles to such an extent that caking of the particles is ruled out. The maximum temperature prior to separation of the particles is material-specific. In general, cooling to a temperature of approximately 500° C. is sufficient.

After formation of the spherical pigment particles the latter may, if desired, be subjected to after treatment with a view to modification of the surface properties. For example, such an after treatment may be a water-repellency treatment which is carried out directly following the formation of the particles, optionally after partial cooling of the pyrolysis gas, or after separation of the particles.

The precursors that form oxide and silicate, that is to say the metal compounds, may be converted into an aerosol in the form of a solution, a suspension or an emulsion. The use of a suspension is only meaningful when the size of the undissolved particles is distinctly smaller than the particle size of the droplets of the aerosol. If an emulsion is converted into an aerosol it is a question, in the case of the emulsion, of an aqueous organic system, the precursors that form oxide or silicate being expediently dissolved in the aqueous phase. Compared to the particularly preferred embodiment of the invention, in accordance with which a solution containing the precursors that form oxide or silicate is converted into an aerosol, the use of the aforementioned emulsion is only of interest when products having particle sizes in the submicron range are to be produced.

With a view to producing the solution, suspension or emulsion to be converted into an aerosol, use may be made both of organic and of aqueous solvent systems. Preferred are aqueous solvent systems such as mixtures consisting of water and water-soluble alcohols, ketones, carboxylic acids or ethers. Particularly preferred, however, is a solvent system consisting substantially of water. The preference for, substantially, water by way of solvent is, besides the obvious economic aspect, also to be ascribed to the fact that in this manner problems associated with a discoloration of the pigments by non-combusted carbon from an organic solvent, which in certain circumstances may be included, are avoided.

With a view to producing the solution to be converted into an aerosol, one or more metal compounds are dissolved that are capable of forming a colored oxide, mixed oxide or silicate under pyrolysis conditions. In the case of pigments containing more than one metal, two or more metal compounds (precursors that form oxide or silicate), whereby one metal has to be chromogenic, are employed substantially in an atomic ratio corresponding to that of the mixed oxide or silicate to be produced. With a view to producing the preferred spinels corresponding to the formula $AB_2O_4$ and also the inverse spinels, A and B are accordingly employed in an atomic ratio of approximately 1 to 2. If various elements A or/and B are to be in the spinel, for example (A,A') (B,B')$_2$O$_4$, the sum of A plus A' amounts to approximately 1 and the sum of B plus B' the expression (B, B')$_2$, amounts to approximately 2.

Expedient metal compounds for the production of an aqueous solution are, in particular, the nitrates of the divalent and trivalent metals. The oxide-forming metals may also be partially employed in the form of halides, salts of low carboxylic acids, sulphates or chelate complexes. In connection with production of the solution, care should be taken in the selection of the metal compounds to ensure that an anion of a metal salt does not cause the cation of a second metal salt, which is optionally additionally used, to precipitate. Suitable precursors for ZrO$_2$ are ZrOCl$_2$ hydrate or Zr(NO$_3$)$_4$, for SnO$_2$ a hydrate of SnCl$_4$ or Sn sulphate; suitable as precursor for TiO$_2$ are, in particular, titanyl chloride and titanyl sulphate, as precursor for Ti$_2$O$_3$, Ti$_2$(C$_2$O$_4$)$_3$. 10H$_2$O. Suitable as precursor for mixed oxides containing a metal oxide pertaining to the fifth main group and subgroup, such as, in particular, Sb$_2$O$_3$, Bi$_2$O$_3$ and Ta$_2$O$_5$, are, in particular, Sb(NO$_3$)$_3$, Bi(NO$_2$)$_3$, TaF$_5$ or Ta$_2$O$_5$. xH$_2$O (tantalic acid). Suitable as precursor for mixed oxides containing MO$_3$ or WO$_3$, or alter-natively molybdates and tungstates, are molybdic acid, tungstic acid or molybdenum dioxydichloride or tungsten dioxydichloride, respectively.

Silicon compounds that can be used by way of precursor for SiO$_2$ and silicates include organosilanes that are soluble in organic solvents, as well as conversion products of SiCl$_4$ with low alcohols or low carboxylic acids. By way of water-soluble silicon source, use may be made of water-soluble organosilanes that comprise at least one functional group making them soluble in water. Use is preferably made of a water-soluble organosilane or organosilanol corresponding to the general formula (RO)$_3$Si—(CH$_2$)$_n$—X or [(RO)$_3$Si—(CH$_2$)$_m$—NR'$_3$]+A-, wherein R and R' may be the same or different and preferably stand for hydrogen, methyl or ethyl, n stands for the number 1, 2 or 3, m stands for the number 2 or 3, X stands for the group —COOH or —SO$_3$H or a salt thereof and A$^-$ stands for an anion, in particular chloride. In the case of the organosilanes or organosilanols it may also be a question of water-soluble precondensed products of the aforementioned compounds.

With a view to producing pigments having a siliceous carrier material, the solutions to be converted into an aerosol contain both a source of SiO$_2$ and at least one source of a color-imparting metal oxide. In this connection the previously named sources of the metal oxides and SiO$_2$ may find application. The source of SiO$_2$ and the additional metal oxide or oxides are employed in the desired stoichiometrical ratio in the aqueous or aqueous/organic solution.

In connection with the preparation of the aqueous solution to be converted into an aerosol, a person skilled in the art will select the individual components in such a way that the oxide-forming and silicate-forming precursors contained in the solution are present in homogeneously dissolved form until the aqueous solution is nebulized. If individual constituents are present in the solution in suspended form, care should be taken to ensure that the particle size is smaller than that of the droplets obtained in the course of nebulizing.

Figure 2:
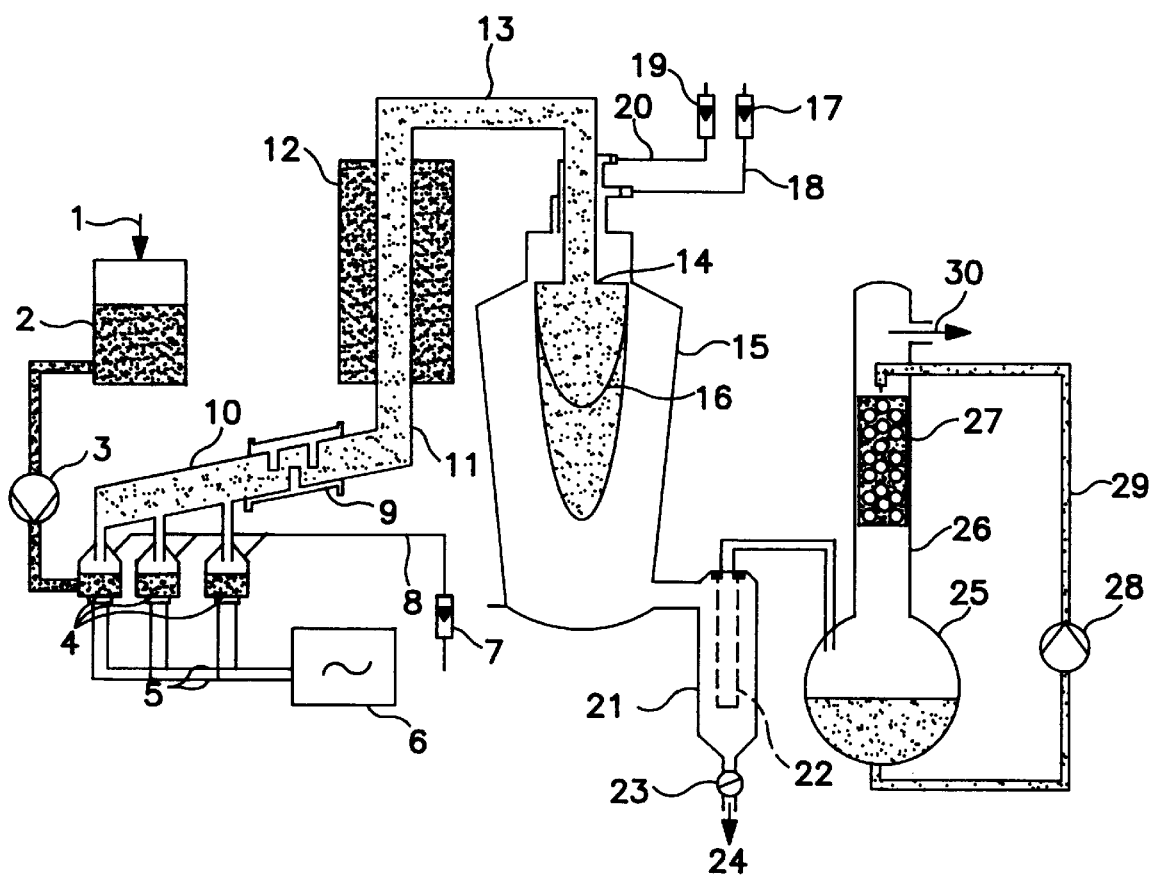
FIG. 2 is a diagrammatic representation of a device for carrying out the process of the invention.

The principle of a preferred embodiment of a device for implementing the process according to the invention is evident from the schematic representation of FIG. 2. Substantial elements of the device are a storage container (2) for the liquid to be nebulized, a high-frequency generator (6) with associated ultrasonic oscillators (4), a droplet eliminator (9), a predryer (11 with 12), the actual pyrolysis reactor (15) with feed lines for the predried aerosol (13 with 14), the combustible gas (20) and the air or oxygen (18), a device for gas/solids separation (21), comprising a filter element (22) and a discharging device for the solids (23 with 24), a washing device for the reaction gas that has been freed from solids, comprising a bubble (25) and washing column (26) filled with packings (27), a circulation line (29) with a circulation pump and also an outlet for the waste gas. With regard to further particulars, reference is made the list of reference symbols.

LIST OF REFERENCE SYMBOLS 1 feed line
2 storage container
3 pump
4 ultrasonic oscillator (transducer with vessel and carrier-gas feed pipe) (=aerosol generator)
5 control lines leading to the oscillators
6 high-frequency generator
7 rotameter
8 gas line for carrier gas
9 drop eliminator
10 collecting pipe
11 predryer
12 heating unit
13 aerosol feed to the reactor
14 nozzle
15 pyrolysis reactor
16 flame
17, 19 rotameters
18 gas line for air or O$_2$
20 gas line for H$_2$
21 eliminator
22 filter element
23 shut-off device
24 pigment discharge
25 bubble
26 column
27 column packings
28 circulation pump
29 circulation line
30 waste-gas line With a view to converting the solution containing the metal compounds into a fine mist, use may be made of conventional devices for the purpose of nebulizing which, however, differ with regard to the drop size that can be obtained, the size distribution of the drops, the throughput, the fluid/propellant ratio and the outflow rate. Two-fluid nozzles are capable of pushing large quantities of liquid through; the smallest average droplet size that can be obtained ordinarily amounts to approximately 10 $\mu$m; with a view to producing a particularly fine pigment powder, in certain circumstances a more strongly diluted solution has to be used. By means of ultrasound-assisted nozzles it is possible to achieve a greater fineness of the droplets, so that powders having a grain diameter of less than 1 $\mu$m are also obtainable. By means of a gas-driven aerosol-generator, for example a Collison® nebulizer, it is possible to obtain a very fine droplet-size range in the region of 3 $\mu$m, but the ratio of carrier gas to quantity of liquid is unfavorable, so that only low outputs can be achieved. By means of electrostatic spraying processes it is possible to generate mist in the submicron range, but with currently known systems only a low throughput can be realized. Preferred nebulizers are ultrasonic nebulizers, with which mist having a particle size of approximately 3 to 4 $\mu$m can be obtained in problem-free manner. In addition it is possible in the case of ultrasonic nebulizers to vary the ratio of gas to liquid freely in problem-free manner. In order to achieve a sufficient throughput it is possible to couple several ultrasonic oscillators to one another. The operational principle of an ultrasonic nebulizer is based on the conversion of mechanical (acoustic) energy into surface energy of the solvent. An ultrasonic oscillator (transducer), a flat round disk made of piezoceramic material, is stimulated to thickness vibration by high-frequency induction. The vibration is transmitted to the column of liquid which is located above a spherical cap and on the surface of which, as a result of cavitation effects, a fountain is formed which disintegrates into extremely small droplets. Care has to be taken in the selection of the oscillators to ensure that corrosion phenomena do not occur in connection with the frequently acidic solutions; silicon-coated oscillators have proved reliable. The oscillators are mounted at an angle of a few degrees on the floors of the vessels which are connected to one another (for reasons of clarity the connecting lines between the ultrasonic oscillators represented in FIG. 2 (transducer with vessel) are not represented). The amount of liquid that has been consumed as a result of being nebulized is replenished from a storage container (2), keeping the level of liquid constant. Each aerosol generator is supplied separately with carrier gas that is fed via a rotameter (7) and a line (8). The individual aerosol streams of the aerosol generators are combined in a collecting pipe (10). If the droplet-size range of the aerosol contains droplets that in some cases are too large and would result in solid particles that are too large, it is expedient to eliminate droplets that are too large by means of a droplet eliminator (9). It is expedient to design the droplet eliminator in such a way that droplets having a diameter of more than 10 $\mu$m, optionally also droplets having a maximum droplet diameter in the range between 5 and 10 $\mu$m, be eliminated and the solution is recycled into the generator. The function of the droplet eliminator is based on an acceleration of the aerosol and a subsequent deflection of the flow, whereby the large droplets are eliminated on a plate that is perpendicular to the flow. Depending on the desired maximum droplet diameter, the elimination rate may amount to up to 50% and above.

In order to obtain solid particles that are as spherical as possible, it has proved advantageous to predry the aerosol before it enters the pyrolysis reactor, for example in a flow tube (11) with a heating unit (12) arranged around it. The process steps taking place in the droplets, namely evaporation of the solvent, separation by precipitation of the precursors of the oxide-forming or silicate-forming material, drying, decomposition and subsequent sintering, require differing periods of time, the evaporation of the solvent being the slowest step. Therefore it is favorable to predry the aerosol, entirely or partially, in a drying device situated upstream of the flame reactor, for example in a heated tube. If predrying is dispensed with, there is a risk of a product being obtained having a broader grain-size range and in particular too much fine material. The temperature of the predryer depends on the concentration of the dissolved precursors and also on the selection of the same. Conventionally the temperature in the predryer lies above the boiling-point of the solvent, up to 250° C. In the case of water as solvent, the temperature in the predryer preferably lies between 120 and 250° C. in particular between 150 and 200° C.

The predried aerosol that is fed to the pyrolysis reactor (15) via a line (13) enters the reactor via an exit aperture (14). In the case of the embodiment represented in the Figure, the hydrogen that is fed via a rotameter (19) and a line (20) enters through a concentric ring that is placed around the aerosol feed line. The secondary air that is fed via a rotameter (17) and a line (18) is introduced through another concentric ring. This arrangement results in balanced momentum flux densities. The manner of delivery of the aerosol, of the combustible gas and of the secondary air is, however, not restricted to the embodiment represented in the Figure. With a view to generating a flame (16) the reactor contains, in addition, an ignition device which is not shown in the Figure. In order to generate a balanced temperature profile, the combustion chamber, which is preferably of tubular design, is insulated (not shown). Directly connected to the combustion chamber of the reactor is a cooling zone—in the case of the reactor according to FIG. 2 the cooling zone is the lower (flame-free) chamber of the reactor.

After leaving the reactor in partially cooled form the reaction gas containing solid particles enters a device (21) for separating the solid particles from the reaction gas. This separating device comprises a filter element (22) and a shut-off device (23) which leads to the pigment discharge (24). Advantageous filter elements are sintered-metal filters and ceramic filters, the latter being particularly preferred since they can be employed at temperatures up to 500° C. and long cooling sections can be avoided. The waste gas passing through the filter element is washed in a washing device (25 to 29) and emerges via the waste-gas line (30). If it was not possible for all of the solid particles to be held back by means of the eliminating device, these substances collect in the washing liquid and may be supplied to a treatment stage.

The process according to the invention permits the production of pigments consisting of substantially spherical particles having an average grain size and a grain-size distribution that can be easily adjusted through the choice of the process parameters, so that grinding processes that have been conventional hitherto are superfluous.

The invention is elucidated in more detail on the basis of the following Examples.

EXAMPLES

Production of various pigments was effected in a device according to FIG. 2, so the description of the device will not be repeated here. In all the Examples use was made of aqueous solutions of metal salts. The reactor contained a temperature-sensing probe in its upper, middle and lower thirds (To, Tm, Tu).

Example 1

Production of Co(AlCr)O$_4$

From 9.83 g Al(NO)$_3$. 9H$_2$O, 10.46 g Cr(NO)$_3$. 9H$_2$O and 7.60 g Co(NO$_3$)$_2$. 6H$_2$O an aqueous solution was produced (molar ratio Al:Cr:Co=1:1:1; 3.62-% relative to total metal content). This solution was converted into an aerosol by means of ultrasound technology and was atomized (carrier gas 1000 l/h air), predried at 150° C. after passage through a droplet eliminator (max. 8 $\mu$m) and subsequently caused to react in the reactor in an oxyhydrogen flame. The temperatures amounted to: To 678° C., Tm 755° C., Tu 517° C. In 90 minutes 13.6 g of product were obtained. The product is obtained as a homogeneous, ultrafine, turquoise-green, crystalline pigment powder having spherical crystallites. The phase purity was verified by means of XRD. The particle distribution yielded the following values: $D_{50}$=1.0 $\mu$m, $D_{90}$= 0.5 $\mu$m, $D_{10}$=3.5 $\mu$m.

After lowering the temperatures in the reactor to To 613° C., Tm 563° C. and Tu 388° C. a turquoise-blue pigment was obtained.

Example 2

Production of $FeAl_2O_4$

From 735.3 g $Fe(NO_3)_3 \cdot 9H_2O$ and 682.8 g $Al(NO_3)_3 \cdot 9H_2O$ and water 5.4 kg of solution were produced (molar ratio Fe:Al=1:2). This solution was nebulized with 1600 l/h air and after predrying at 150° C. the aerosol was transported into an oxyhydrogen flame. A brown, crystalline pigment was obtained. The pigment had spinel structure and consisted of spherical particles; $D_{50}$=0.77 μm, $D_{90}$=0.4 μm, $D_{10}$=1.55 μm.

Example 3

Production of $CuCrFeO_4$

To 139.2 g $Cu(NO_3)_2 \cdot 3H_2O$ and 233.0 g $Fe(NO_3)_3 \cdot 9H_2O$ and 230.7 g $Cr(NO_3)_3 \cdot 9H_2O$ 1.41 l water were added (molar ratio Cu:Cr:Fe=1:1:1). This solution was nebulized by means of ultrasound and transported with nitrogen as carrier gas into an oxyhydrogen flame after passing through a droplet eliminator and predryer (150° C.). In the process a black, crystalline pigment having spinel structure was obtained. FIG. 1 shows an SEM photograph, from which the perfect spherical shape is evident. Grain distribution $D_{50}$= 1.3 μm, $D_{90}$=0.6 μm, $D_{10}$=2.7 μm.

Example 4

Production of $SnO_2/Cr_2O_3$

A solution of 292 g $SnCl_4 \cdot 5H_2O$, 7.68 g $Cr(NO_3)_3 \cdot 9H_2O$ and 1700 ml water was caused to react in accordance with Example 1 (weight ratio Sn:Cr=99.1). A pink-colored pigment was formed.

Example 5

Production of $ZrO_2/V_2O_5$

An acetic solution of 585.95 g zirconyl acetate ($ZrO_2$ content 22.5%), 4.6 g $NH_4VO_3$ and 1.4 l water was caused to react in accordance with Example 1 (weight ratio Zr:V 98:2). A yellow pigment consisting of spherical particles was formed. $D_{50}$=0.9 μm, $D_{90}$=0.4 $D_{10}$=1.9 μm.

Comparative Example 1

The effect on the vanadium-doped zirconium dioxide obtained in Example 5 of a calcination temperature such as is required within the scope of the process according to ES-PS 2 074 399 was investigated:

4 g of pigment were heated up to 1500° C. and held for 6 minutes at 1500° C. The caked product was crushed. The grain-size distribution was determined as usual by means of laser diffraction (CILAS), for which purpose the sample was suspended in water in the presence of Na pyrophosphate by means of an ultrasonic mixer:

The narrow grain-size range of the initial product was considerably broadened: $D_{10}$=22 μm. $D_{20}$=15 μm, $D_{30}$=9.8 μm, $D_{50}$=5.2 μm, $D_{70}$=2.7 μm, $D_{90}$=0.9 μm. As a result of sintering, solid agglomerates were formed which could only be comminuted by grinding.

Example 6

By analogy with Examples 1 to 3 a black spinel coloring matter was produced corresponding to the formula $CoNiCrFeO_4$ (FK No. 402), the nitrates of the metals being employed in each case. The coloring matter according to the invention was investigated in various applications in comparison with a classically produced non-spherical coloring matter of the same composition (FK No. 24137, Cerdec AG).

a) Inglaze Decorative-Color Application (High-Temperature Fast Firing)

3.75 g glass flux (No. 10115, Cerdec AG) were dispersed together with a medium (80820, Cerdec AG) with 1.25 g of coloring matter without premixing in a pasting machine. After indirect printing (transfer technique), firing was effected on porcelain in a gas-tunnel kiln at 1220° C. (flow time 90 min.). The Table contains the L*a*b* values according to the CIELAB formula (DIN 6174).

| FK No. | System | L* | a* | b* |
|---|---|---|---|---|
| 24137 | $CoNiCrFeO_4$ | 8.47 | 0.77 | 0.50 |
| 402 | $CoNiCrFeO_4$ | 6.36 | 1.05 | 0.86 |

The coloring matter according to the invention resulted in a deeper black (=lower L* value).

b) Onglaze Decorative-Color Application 4 g glass flux (No. 10150, Cerdec AG) were dispersed together with a medium with 1 g of coloring matter without premixing in a pasting machine. After indirect printing, firing was effected on porcelain in an electric chamber kiln at 820° C., 120 min. heating-time and 10 min. holding-time.

| FK No. | System | L* | a* | b* |
|---|---|---|---|---|
| 24137 | $CoNiCrFeO_4$ | 19.43 | 0.30 | −0.10 |
| 402 | $CoNiCrFeO_4$ | 17.64 | 0.52 | 0.11 | c) Coloring of Plastics 0.75 g of coloring matter was made into a paste with 2 g PVC paste, extruded into a foil with a 300 μm slide spacing and subsequently dried.

| FK No. | System | L* | a* | b* |
|---|---|---|---|---|
| 24137 | $CoNiCrFeO_4$ | 5.26 | 0.83 | 0.54 |
| 402 | $CoNiCrFeO_4$ | 4.68 | 0.76 | 0.92 |

What is claimed is:

1. A process for producing a spherical colored pigment having an average particle diameter of from 0.5 μm to less than 10 μm and a spinel structure of the general formula $AB_2O_4$, $B(AB)O_4$ or $DE_2O_4$ where A is selected from the group consisting of $Mg^{2+}$, $Ca^{2+}$, $Sr^{2+}$, $Ba^{2+}$, $Mn^{2+}$, $Fe^{2+}$, $Co^{2+}$, $Ni^{2+}$, $Cu^{2+}$ and $Zn^{2+}$, B is selected from the group consisting of $Al^{3+}$, $Ga^{3+}$, $In^{3+}$, $Sc^{3+}$, $Ln^{3+}$, $Ti^{3+}$, $V^{3+}$, $Cr^{3+}$, $Fe^{3+}$, $Ni^{3+}$, and $Co^{3+}$, D is selected from the group consisting of $Ti^{4+}$ and $Zr^{4+}$, and E is selected from the group consisting of $Fe^{2+}$, $Co^{2+}$ and $Ni^{2+}$, the process comprising (i) preparing a solution containing spinel-forming metal compounds and a solvent for the spinel-forming compounds, including at least one color-imparting metal compound in a quantity that is effective as a pigment, (ii) converting the solution into an aerosol, (iii) predrying the aerosol at a temperature in the range from above a boiling-point of the solvent to 250° C., (iv) introducing the aerosol into a pyrolysis reactor that is heated directly or indirectly, (v) implementing pyrolysis at a temperature above a decomposition temperature of the metal compounds to produce a pyrolysis gas, and (vi) recovering the pigment from the pyrolysis gas.

2. A process according to claim 1, wherein the aerosol is passed through a droplet separator prior to predrying.

3. A process according to claim 1, wherein the solvent for the solution is water or a solvent mixture containing predominantly water.

4. A process according to claim 1, wherein the pyrolysis reactor is heated directly.

5. A process according to claim 4, wherein the heating is by means of an oxyhydrogen flame ($H_2/O_2$ or $H_2$/air).

6. A process according to claim 1, wherein a plurality of metal compounds are employed each in the form of a water-soluble salt, and the anion of one salt does not cause a cation of a second salt to precipitate.

7. A process according to claim 1, wherein use is made of compounds of divalent metals selected from the group consisting of $Mn^{2+}$, $Fe^{2+}$, $Co^{2+}$, $Ni^{2+}$ and $Cu^{2+}$ and compounds of trivalent metals selected from the group consisting of $Al^{3+}$, $Cr^{3+}$, $Fe^{3+}$ and $Co^{3+}$ and wherein one or more divalent and trivalent metals may be present.

8. A process according to claim 1, wherein use is made of divalent and trivalent metals in the form of their nitrate, and use is made of zirconium tetranitrate or $ZrOCl_2$ hydrate as precursor for $ZrO_2$, and use is made of a tin tetrachloride hydrate as precursor for $SnO_2$, to produce a substantially aqueous aerosol.

9. A process according to claim 1, wherein the solution is a substantially aqueous solution containing one or more water-soluble oxide-forming or silicate-forming metal compounds, and the solution is converted by means of an ultrasonic nebulizer into an aerosol, the latter is conducted, after passing through a droplet separator in order to eliminate droplets having a diameter of more than approximately 10 $\mu$m, through a predryer that is heated to a temperature in the range from 120 to 2000° C., and the predried aerosol is fed to a pyrolysis reactor that is directly heated by means of an oxyhydrogen flame and the colored pigment is separated from the pyrolysis gas by means of a sintered-metal filter or a ceramic filter.

10. In a method for the production of ceramic decorations or for the coloring of a plastic, a synthetic foil, a fiber or a lacquer which comprises applying a pigment to or incorporating a pigment into said ceramic decoration, plastic, synthetic foil, fiber or lacquer, the improvement wherein the pigment is at least in part a spherical colored pigment prepared by the process of claim 1.

11. A method according to claim 10, wherein the spherical pigment is combined with a white spherical pigment.

12. A method according to claim 10, wherein the fiber is produced by coloring a fiber-forming thermoplastic polymer in the melt state with the spherical colored pigment, and the colored polymer is then spun by means of melt spinning.

13. A method according to claim 10, wherein the spherical colored pigment is blended with a glass frit without any grinding process and, after addition of a medium, is applied onto a substrate to be decorated by means of screen printing or by means of a transfer technique.

* * * * *